(12) United States Patent
Derscheid et al.

(10) Patent No.: US 11,060,176 B2
(45) Date of Patent: Jul. 13, 2021

(54) CUTTING BLADE FOR AN AGRICULTURAL IMPLEMENT, AND METHOD OF MANUFACTURING THE SAME

(71) Applicant: DEERE & COMPANY, Moline, IL (US)

(72) Inventors: Daniel E. Derscheid, Hedrick, IA (US); Brent A. Augustine, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/662,081

(22) Filed: Oct. 24, 2019

(65) Prior Publication Data
US 2021/0123127 A1  Apr. 29, 2021

(51) Int. Cl.
| | | |
|---|---|---|
| *B23P 15/28* | (2006.01) | |
| *C23C 8/70* | (2006.01) | |
| *C21D 9/24* | (2006.01) | |
| *C23C 8/32* | (2006.01) | |
| *C23C 8/26* | (2006.01) | |
| *A01D 34/73* | (2006.01) | |

(52) U.S. Cl.
CPC .............. *C23C 8/70* (2013.01); *B23P 15/28* (2013.01); *C21D 9/24* (2013.01); *C23C 8/26* (2013.01); *C23C 8/32* (2013.01); *A01D 34/73* (2013.01)

(58) Field of Classification Search
CPC ..... C23C 8/70; C23C 8/26; C23C 8/32; B23P 15/28; A01D 34/73
See application file for complete search history.

(56) References Cited

U.S. PATENT DOCUMENTS

| 6,067,784 | A | 5/2000 | Jordan | |
|---|---|---|---|---|
| 8,592,711 | B2 * | 11/2013 | Lambert | ................... B26B 9/00 |
| | | | | 219/76.13 |
| 9,068,260 | B2 * | 6/2015 | Carlisle | ..................... C23C 8/36 |
| 9,393,649 | B2 * | 7/2016 | Ehrle | ................... B23K 10/027 |
| 10,160,127 | B2 | 12/2018 | Dutta et al. | |
| 2013/0233145 | A1 | 9/2013 | Sotelo et al. | |
| 2013/0239769 | A1 * | 9/2013 | Carlisle | ................ B26D 1/0006 |
| | | | | 83/651 |
| 2014/0045562 | A1 | 2/2014 | Adamczyk et al. | |

(Continued)

FOREIGN PATENT DOCUMENTS

| WO | WO0168290 A1 | 9/2001 |
|---|---|---|
| WO | WO2016172043 A1 | 10/2016 |

OTHER PUBLICATIONS

European Search Report issued in counterpart application No. 20202757.9 dated Mar. 5, 2021 (8 pages).

*Primary Examiner* — Omar Flores Sanchez

(57) ABSTRACT

The disclosure provides a method of manufacturing a cutting blade for an agricultural implement. The method includes forming the cutting blade to define a final shape having an exterior surface. The cutting blade is treated with a surface diffusion hardening process to form a surface hardened layer disposed over a core layer. The surface hardened layer is very thin, approximately 0.1 mm, and exhibits an apparent hardness equal to or greater than 1000 HV. After the surface diffusion hardening process, the cutting blade is treated with a through hardening process, such that the core layer exhibits a Rockwell Hardness C Scale value between the range of thirty five (35) and fifty five (55).

22 Claims, 4 Drawing Sheets

(56) References Cited

U.S. PATENT DOCUMENTS

| | | |
|---|---|---|
| 2016/0073582 A1 | 3/2016 | Stoffel et al. |
| 2016/0157423 A1 | 6/2016 | Stoffel et al. |
| 2019/0210096 A1* | 7/2019 | Dovel .................... B23P 15/40 |
| 2020/0215646 A1* | 7/2020 | Lambert .............. B23K 26/342 |

* cited by examiner

CUTTING BLADE FOR AN AGRICULTURAL IMPLEMENT, AND METHOD OF MANUFACTURING THE SAME

TECHNICAL FIELD

The disclosure generally relates to a method of manufacturing a cutting blade for an agricultural implement.

BACKGROUND

Many different types of agricultural implements use a cutting blade. Agricultural implements that use various different types of cutting blades include, but are not limited to, lawn mowers, windrowers, mower conditioners, forage harvesters, balers, etc. For example, a baler may include a pre-cutting system that cuts the crop material just prior to feeding the crop material into the baling chamber. The pre-cutting system includes a plurality of cutting blades, commonly referred to as knives, that are spaced apart and disposed in a parallel relationship. The crop material is fed through the pre-cutter knives as it is passed into the baling chamber. The pre-cutter knives cut the crop material into shorter lengths prior to baling.

The cutting blades in agricultural implements are subjected to abrasive materials during normal operation. For example, sand and/or dirt in the crop material abrades against the cutting blades, causing them to dull over time. When the cutting blades become dull, they do not cut well and/or may require more power to operate. Additionally, the cutting blades may occasionally be subjected to impact forces, such as when a rock or other debris contacts the cutting blade. The impact forces may bend or deform the cutting blade, thereby damaging the cutting edge and dulling the cutting blade. In some configurations, the cutting blades may be sharpened, but this requires time and removes the implement from operation.

The cutting blades are typically manufactured from steel. Some cutting blades are heat treated to increase the hardness of the steel and thereby improve wear resistance. However, if the cutting blade is too hard, it becomes brittle and subject to chipping and/or fracture. Other cutting blades are coated with a hard coating, e.g., epoxy, that is applied to the exterior of the cutting blades. The hard coating layer adds thickness and friction to the cutting blade and may chip when impacted by a rock or other debris.

SUMMARY

The disclosure provides a method of manufacturing a cutting blade for an agricultural implement. The method includes forming the cutting blade to define a final shape having an exterior surface. The final shape of the cutting blade is treated with a surface diffusion hardening process. The surface diffusion hardening process diffuses atoms into the exterior surface of the cutting blade to form a surface hardened layer disposed over a core layer. The final shape of the cutting blade is treated with a through hardening process, such that the core layer exhibits a Rockwell Hardness C Scale value between the range of thirty five (35) and fifty five (55).

In one aspect of the disclosure, the surface diffusion hardening process includes one of a boronizing process, a nitriding process, or a nitrocarburizing process. In one example embodiment, the surface diffusion hardening process includes the boronizing process, in which boron atoms are diffused into the exterior surface of the cutting blade to form a surface hardened boronized layer.

In one aspect of the disclosure, the cutting blade is treated with the surface diffusion hardening process such that the surface hardened layer includes a thickness between the range of 0.00 mm and 0.2 mm. In one embodiment, the thickness of the surface hardened layer is between the range of 0.05 mm and 0.15 mm. In one example embodiment, the thickness of the surface hardened layer is approximately equal to 0.10 mm.

In one aspect of the disclosure, the cutting blade is treated with the surface diffusion hardening process such that the surface hardened layer exhibits an apparent hardness having a Vickers Hardness number greater than 1000 HV when tested using the Vickers Hardness Test. In one embodiment of the disclosure, the apparent hardness of the surface hardened layer exhibits a Vickers Hardness number greater than 1200 HV when tested using the Vickers Hardness Test.

In one aspect of the disclosure, the cutting blade is treated with the through hardening process after treating the final shape of the cutting blade with the surface diffusion hardening process.

In one aspect of the disclosure, the cutting blade is formed from a steel blank. The final shape of the cutting blade is formed to define a first exterior surface and a second exterior surface that intersect each other to define a cutting edge. In one embodiment of the disclosure, both the first exterior surface and the second exterior surface are treated with the surface diffusion hardening process. In another embodiment of the disclosure, only one of the first exterior surface and the second exterior surface is treated with the surface diffusion hardening process.

In one aspect of the disclosure, the method may further include masking one of the first exterior surface and the second exterior surface to define a masked surface. The masked surface prevents or blocks diffusion atoms from diffusing into the exterior surface of the butting blade, thereby preventing the surface hardened layer from forming adjacent the first exterior surface or the second exterior surface over which the masking is applied.

In one aspect of the disclosure, treating the final shape of the cutting blade with the through hardening process includes heating the final shape of the cutting blade to a defined uniform temperature throughout the core layer, quenching the cutting blade in a liquid after heating the core layer of the cutting blade to the defined uniform temperature, and then tempering the cutting blade after the cutting blade has been quenched. In another aspect of the disclosure, treating the final shape of the cutting blade with the through hardening process includes treating the final shape of the cutting blade with an austempering process.

In one aspect of the disclosure, the cutting blade does not include a coating layer, such as but not limited to an epoxy layer, disposed over the exterior surface of the final shape of the cutting blade.

A cutting blade for an agricultural implement is also provided. The cutting blade includes a body having a first exterior surface intersecting a second exterior surface to define a cutting edge therebetween. The body includes a surface hardened layer disposed immediately adjacent to one of the first exterior surface and the second exterior surface, and a core layer disposed immediately adjacent to the surface hardened layer. The surface hardened layer includes a thickness between the range of 0.00 mm and 0.2 mm. The core layer exhibits a Rockwell Hardness C Scale value between the range of thirty five (35) and fifty five (55).

In one aspect of the disclosure, the surface hardened layer exhibits an apparent hardness having a Vickers Hardness number greater than 1000 HV when tested using the Vickers Hardness Test. In one example embodiment, the apparent hardness of the surface hardened layer exhibits a Vickers Hardness number greater than 1200 HV when tested using the Vickers Hardness Test.

In one example embodiment, the thickness of the surface hardened layer is between the range of 0.05 mm and 0.15 mm. In another example embodiment, the thickness of the surface hardened layer is approximately equal to 0.10 mm In one example embodiment, the surface hardened layer includes a first portion disposed adjacent to the first exterior surface and a second portion disposed adjacent to the second exterior surface, with the core layer disposed between the first portion and the second portion of the surface hardened layer. In another embodiment, the surface hardened layer is disposed immediately adjacent only one of the first exterior surface and the second exterior surface.

In one aspect of the disclosure, one of the first exterior surface and the second exterior surface may include serrations.

In one aspect of the disclosure, the body is shaped to form a pre-cutter knife for a crop harvesting implement, or a blade for a mowing implement.

In one embodiment of the disclosure, the surface hardened layer includes boron atoms diffused therein via a boronizing process.

Accordingly, the surface hardened layer formed using the surface diffusion hardening process provides a very hard surface that resists abrasion. Since the surface hardening is done through diffusion into the metal blank, the surface hardened layer is not separated from the core layer, and remains an integral part of the metal blank. As such, it should be appreciated that the surface hardened layer and the core layer do not include a distinct joint or separation dividing the two. Additionally, because the surface hardened layer is very thin, e.g., a thickness of approximately 0.10 mm for example, the surface hardened layer avoids brittle failure when impacted by rocks and/or other debris. Additionally, by through hardening the core layer, the core layer exhibits the toughness and yield strength to resists loads and impacts that could otherwise deform the cutting edge, while avoiding the high hardness levels that are subject to brittle failure. The cutting blade manufactured in accordance with this disclosure exhibits extreme wear and impact resistance, thereby providing a sharp cutting edge over an extended period of time not possible with prior art cutting blades.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
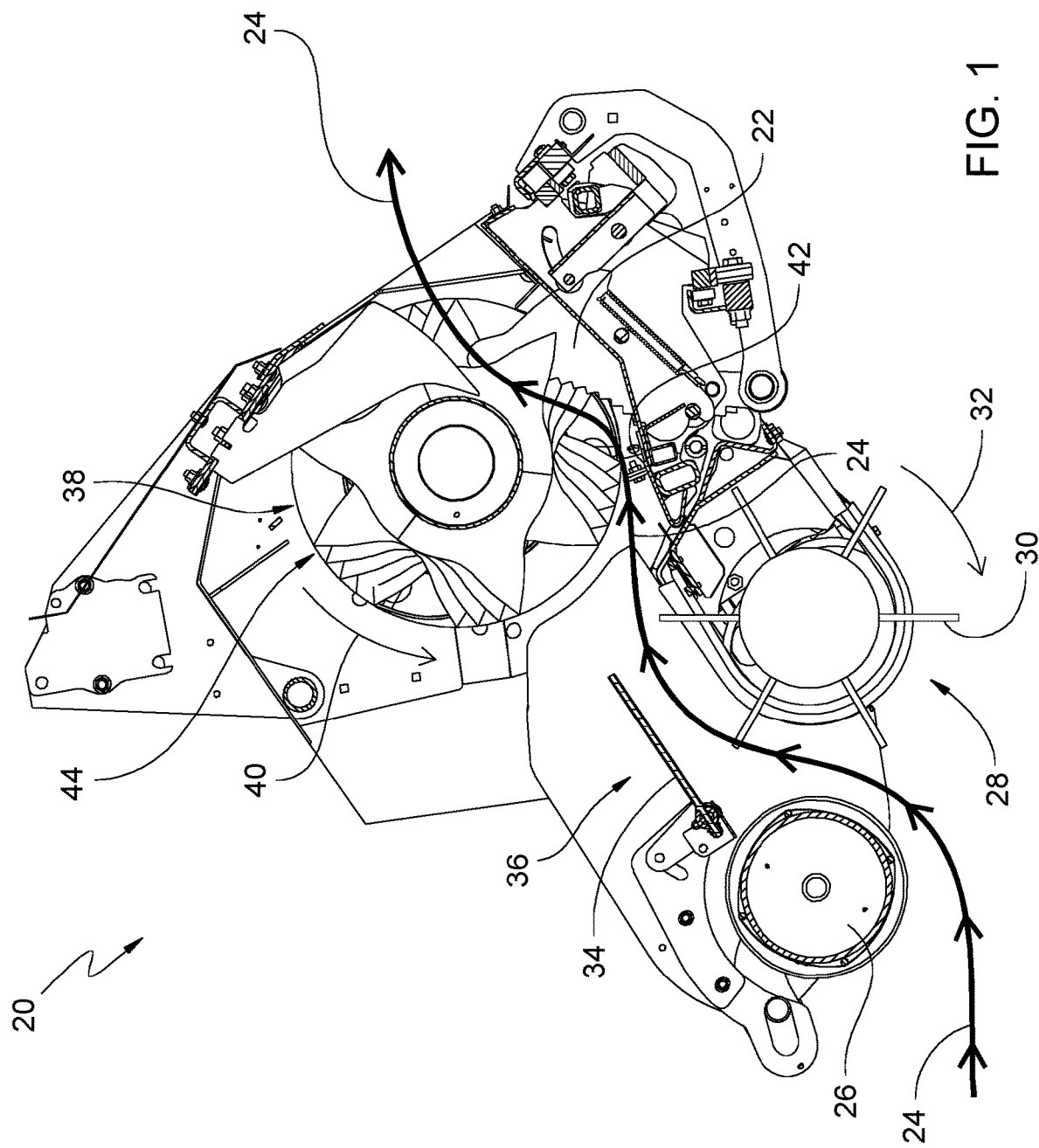
FIG. 1 is a schematic side view of a baler including a pre-cutter knife, i.e., a cutting blade.

Referring to the Figures, wherein like numerals indicate like parts throughout the several views, a pickup assembly 20 is generally shown at 20 in FIG. 1. The pickup assembly 20 may be coupled to a baler (not shown) for feeding crop material into a baling chamber of the baler, as is understood by those skilled in the art. The pickup assembly 20 includes an example embodiment of a cutting blade 22. The cutting blade 22 of the pickup assembly 20 may alternatively be referred to as a pre-cutter knife. The disclosure is described with reference to the example embodiment of the cutting blade 22 configured as the pre-cutter knife of the pickup assembly 20. However, it should be appreciated that the teachings of this disclosure may be applied to other configurations and/or embodiments of the cutting blade 22, and used in other agricultural implements. For example, other embodiments may include the cutting blade configured as a lawn mower blade for a small tractor or zero turn mower, a rotary cutting blade 2 for a mower conditioner or windrower, a cutting blade for a forage harvester, etc.

Referring to FIG. 1, the pickup assembly 20 directs cut crop material along a crop flow path 24. The crop flow path 24 may begin under a pickup roller 26 where the crop sits on an underlying surface in a swath. As the crop approaches a rotary pickup 28, a plurality of tines 30 may be rotating about the rotary pickup 28 in a pickup direction 32 to urge the crop along the crop flow path 24 between the pickup roller 26 and the rotary pickup 28. Then, the rotary pickup 28 may continue to urge the crop along the crop flow path 24 between the rotary pickup 28 and a plurality of guide bars 34 of a crop guide 36.

The tines 30 may continue to move the crop along the crop flow path 24 towards a rotor assembly 38. The rotor assembly 38 may rotate in an undershot direction 40 so a leading portion of the rotor assembly 38 moves the crop material towards a rotor floor 42. As the rotor assembly 38 rotates in the undershot direction 40, a plurality of teeth 44 may contact the crop material and force the crop material along the crop flow path 24 between the rotor assembly 38 and the rotor floor 42 and into a plurality of pre-cutter knives, i.e., the cutting blades 22. As the crop is moved along the crop flow path 24 past the cutting blades 22, the crop may be cut into smaller segments for further processing by a baler (not shown).

Figure 2:
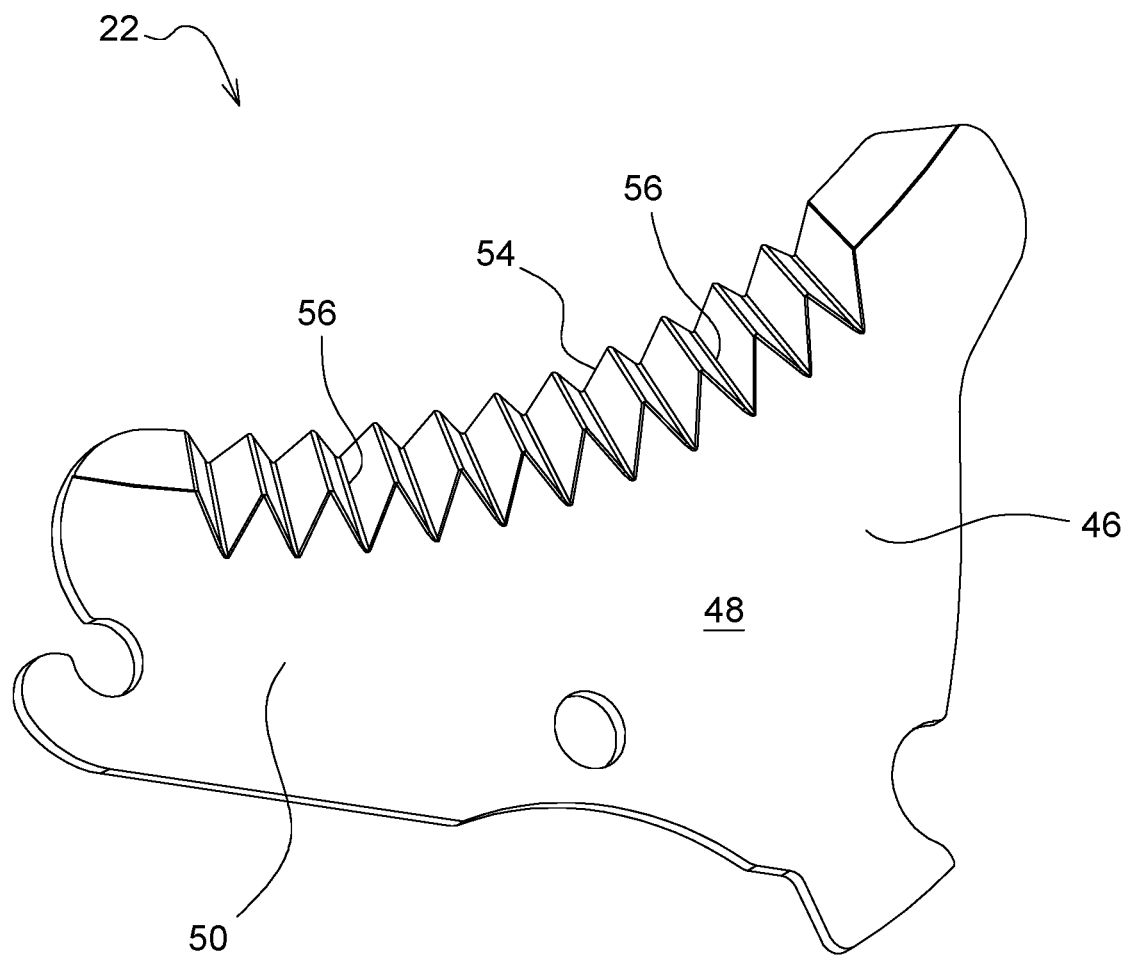
FIG. 2 is a schematic perspective view of the pre-cutter knife showing a scalloped side of the pre-cutter knife.
Figure 3:
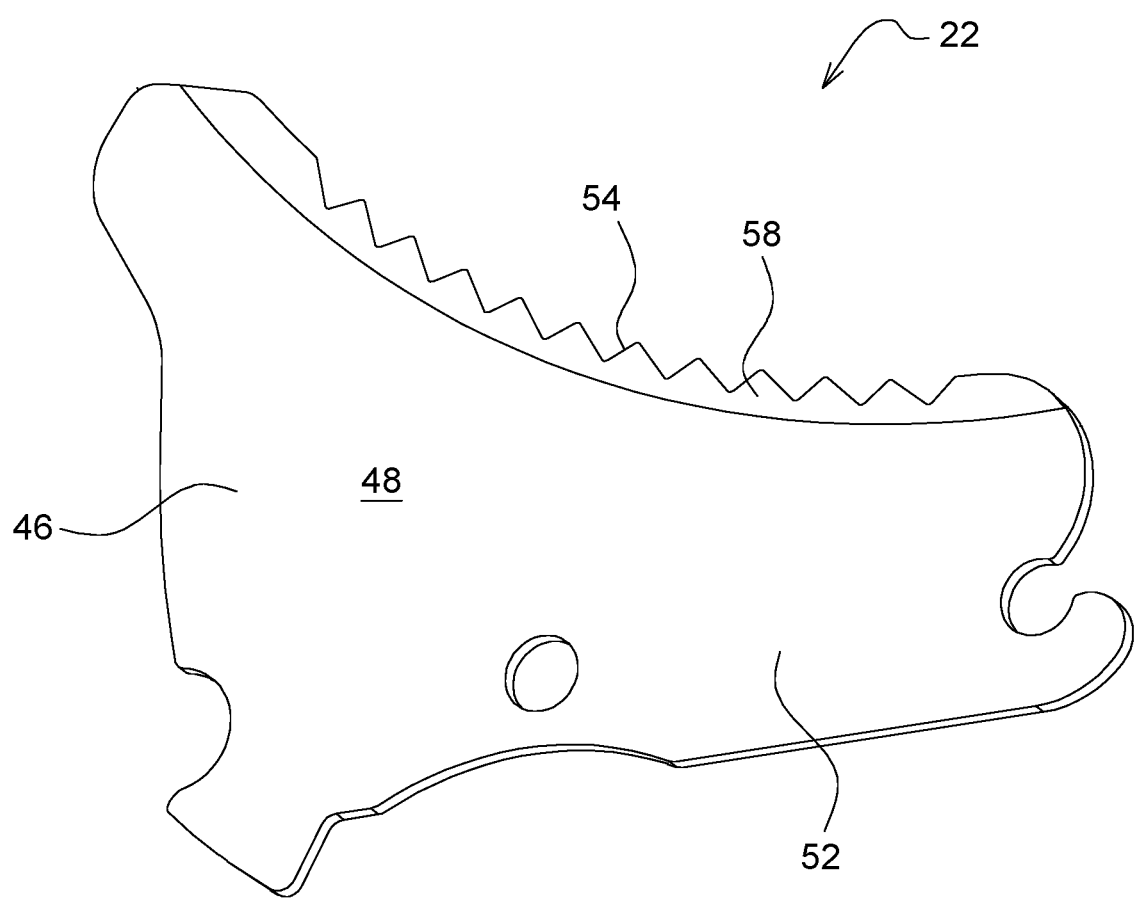
FIG. 3 is a schematic perspective view of the pre-cutter knife showing a beveled side of the pre-cutter knife.
Figure 4:
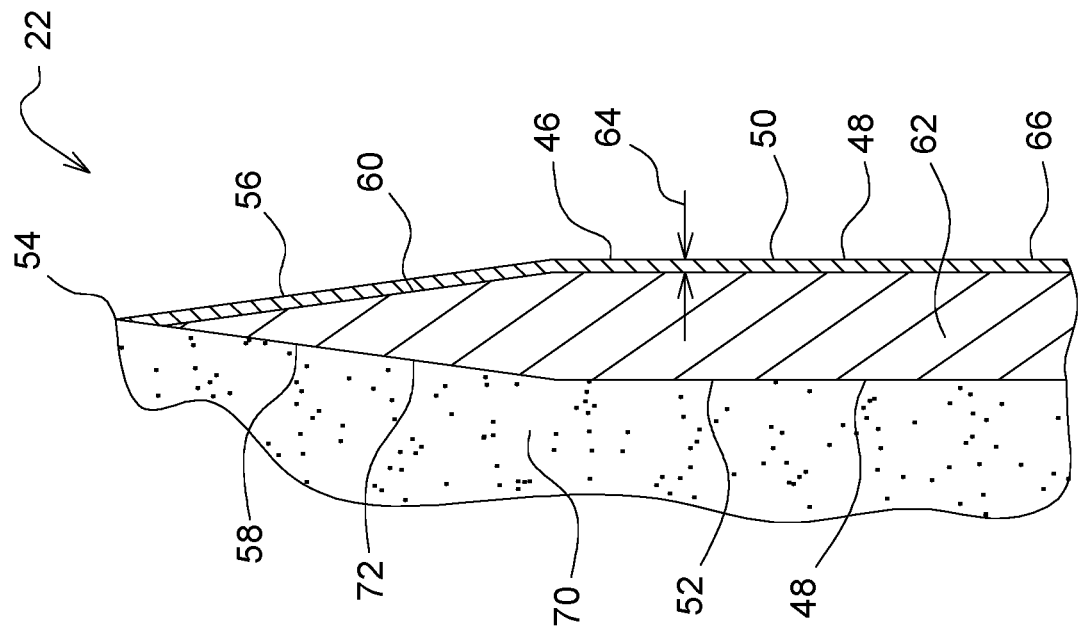
FIG. 4 is a schematic cross-sectional view of the pre-cutter knife.

Referring to FIGS. 2-4, a single cutting blade 22 is described. The cutting blade 22 includes a body 46 that is shaped to form or define a final shape having an exterior surface 48. In the example embodiment described herein, the body 46 is manufactured from steel. However, it should be appreciated that the body 46 may be manufactured from other metals and/or materials suitable for the particular application. In the example embodiment, the cutting blade 22 is shaped and/or formed to define the pre-cutter knife of the pickup assembly 20. However, it should be appreciated that the cutting blade 22 may be shaped and/or formed to define a final shape different than the example embodiment shown in the Figures and described herein.

The exterior surface 48 of the body 46 includes a first exterior surface 50 and a second exterior surface 52. The first exterior surface 50 and the second exterior surface 52 are disposed on opposing sides of the body 46, and intersect each other to define a cutting edge 54 therebetween. In some embodiments, one of the first exterior surface 50 and the second exterior surface 52 may include serrations or scallops 56. Additionally, one of the first exterior surface 50 and the second exterior surface 52 may include a bevel 58. In the example embodiment shown in the Figures and described herein, the first exterior surface 50 includes the scallops 56, and the second exterior surface 52 includes the bevel 58. However, it should be appreciated that other embodiments may not include the bevel 58 and/or the scallops 56.

The body 46 includes a surface hardened layer 60 disposed immediately adjacent to at least one of the first exterior surface 50 and the second exterior surface 52, and a core layer 62 disposed immediately adjacent to the surface hardened layer 60. The surface hardened layer 60 is a portion of the body 46 in which atoms of a diffusion material have been introduced therein. For example, if the surface hardened layer 60 is formed from a boronizing process, then the surface hardened layer includes boron atoms diffused therein. As such, the surface hardened layer 60 is an integral portion of the body 46 disposed at the first exterior surface 50 and/or the second exterior surface 52, and is not a separate layer that is added onto the body 46.

As best shown in FIG. 4, the surface hardened layer 60 includes a thickness 64 between the range of 0.00 mm and 0.2 mm. In one embodiment, the thickness 64 of the surface hardened layer 60 is between the range of 0.05 mm and 0.15 mm. For example, the thickness 64 of the surface hardened layer 60 may be approximately and/or substantially equal to 0.10 mm.

The surface hardened layer 60 exhibits an apparent hardness having a Vickers Hardness number greater than 1000 HV when tested using the Vickers Hardness Test. In one embodiment, the apparent hardness of the surface hardened layer 60 exhibits a Vickers Hardness number greater than 1200 HV when tested using the Vickers Hardness Test. As is understood by those skilled in the art, due to the differences in gross indentation and structure, the value of hardness in powdered metallurgy materials and wrought metals cannot be directly compared, because the indenter passes through the permeable structure, resulting in a lower value of hardness relative to the intrinsic hardness of the material. When the hardness values of such materials are obtained on testers that are on a macro-hardness scale, such as the Vickers Hardness Scale, it is the apparent hardness that is obtained. The apparent hardness is the combined effect of the actual particle hardness of the material and its porosity. It should be appreciated that the Vickers Hardness Scale is only an example scale against which to measure hardness values of materials. It should be appreciated that the values described above for the Vickers Hardness number may be expressed or converted to a hardness number on some other microhardness scale, such as but not limited to the Knoop hardness scale.

The surface hardened layer 60 is a very thin and extremely hard layer that resists abrasive wear during use. Because the surface diffusion hardening process is a diffusion process that introduces the atoms of a diffusion material into the body 46 of the cutting blade 22, the surface hardened layer 60 is not separated from the core layer 62, and does not add thickness 64 to the cutting blade 22. Notably, the cutting blade 22 does not include a coating layer disposed over the exterior surface 48 of the final shape of the cutting blade 22. Because the surface hardened layer 60 is very thin, it resists brittle failure, e.g., chipping, when impacted by solid objects such as rocks and/or other debris.

The core layer 62 is heat treated with a through hardening process, and exhibits a Rockwell Hardness C Scale value between the range of thirty five (35) and fifty five (55). The core layer 62 is heat treated to exhibit the desired HRC value to develop toughness and yield strength which resists loads and impacts that could otherwise deform the cutting edge 54 and/or body 46 of the cutting blade 22, while avoiding high hardness levels that are subject to brittle failure.

In the example embodiment shown in FIG. 4, the surface hardened layer 60 includes a first portion 66 disposed adjacent to the first exterior surface 50 and a second portion 68 disposed adjacent to the second exterior surface 52. The core layer 62 is disposed between the first portion 66 and the second portion 68 of the surface hardened layer 60. The cutting edge 54 is disposed at the intersection of the first portion 66 and the second portion 68 of the surface hardened layer 60.

Figure 5:
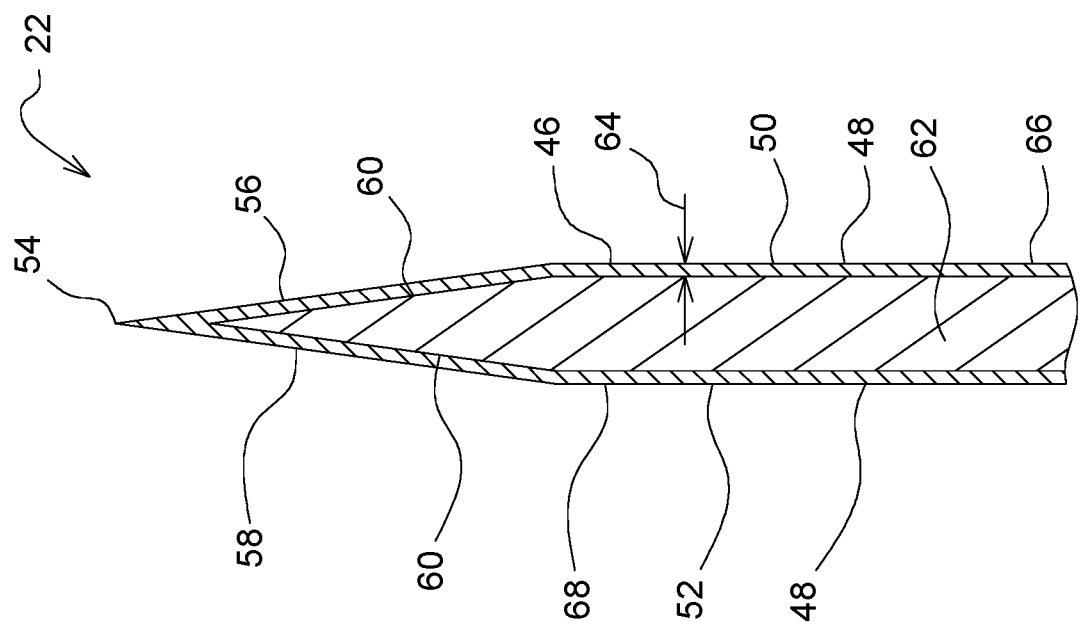
FIG. 5 is a schematic cross-sectional view of a first alternative embodiment of the pre-cutter knife.

Referring to FIG. 5, a first alternative embodiment of the cutting blade 22 is generally shown. The cutting blade 22 includes only one of the first exterior surface 50 and the second exterior surface 52 treated with the surface diffusion hardening process, such that the surface hardened layer 60 is only disposed against one of the first exterior surface 50 and the second exterior surface 52. In the example embodiment shown in FIG. 5, the surface hardened layer 60 is disposed adjacent the first exterior surface 50. While FIG. 5 shows the surface hardened layer 60 adjacent the first exterior surface 50, it should be appreciated that the surface hardened layer 60 may alternatively be disposed adjacent the second exterior surface 52.

A method of manufacturing the cutting blade 22 is also provided. The method includes forming the cutting blade 22 to define its final shape having its exterior surface 48. The final shape of the cutting blade 22 is formed from a blank. The blank may include a suitable material, such as but not limited to steel or some other metal material. The final shape of the cutting blade 22 depends upon the specific application. However, forming the cutting blade 22 to define the final shape may include forming the blank to define body 46 having the first exterior surface 50 and the second exterior surface 52 that intersect each other to define the cutting edge 54.

After the blank has been formed to define the final shape of the cutting blade 22, the cutting blade 22 is treated with the surface diffusion hardening process. The surface diffusion hardening process may include, but is no limited to, a boronizing process, a nitriding process, or a nitrocarburizing process.

As understood by those skilled in the art, the boronizing surface diffusion hardening process is a thermochemical surface hardening process in which boron atoms are diffused into a surface of the cutting blade 22 to form complex borides with the base metal of the blank. As a result of the boronizing surface diffusion hardening process, boron atoms are diffused into the exterior surface 48 of the cutting blade 22 to form the surface hardened layer 60 disposed against the core layer 62. There is no mechanical interface between the surface hardened layer 60 and the core layer 62, as this is a true diffusion process. As known in the art, the boronizing surface diffusion hardening process includes heating the cutting blade 22 in a boron rich environment to a temperature of between, for example, 1,300° F. and 1,850° F.

As understood by those skilled in the art, the nitriding surface diffusion hardening process is a thermochemical surface hardening process in which nitrogen atoms are diffused into a surface of the cutting blade 22 to form nitrides with the base metal of the blank. As a result of the nitriding surface diffusion hardening process, nitrogen atoms are diffused into the exterior surface 48 of the cutting blade 22 to form the surface hardened layer 60 disposed against the core layer 62. There is no mechanical interface between the surface hardened layer 60 and the core layer 62, as this is a true diffusion process.

As understood by those skilled in the art, the nitrocarburizing surface diffusion hardening process is a thermochemical surface hardening process in which nitrogen and carbon atoms are diffused into a surface of the cutting blade 22. As a result of the nitrocarburizing surface diffusion hardening process, nitrogen and carbon atoms are diffused into the exterior surface 48 of the cutting blade 22 to form the surface hardened layer 60 disposed against the core layer 62. There is no mechanical interface between the surface hardened layer 60 and the core layer 62, as this is a true diffusion process.

The thickness 64 of the surface hardened layer 60 is dependent upon the temperature to which the cutting blade 22 was heated during the surface diffusion hardening process, the treatment time of the surface diffusion hardening process, and the material of the blank forming the cutting blade 22. The cutting blade 22 is treated with the surface diffusion hardening process such that the thickness 64 of the surface hardened layer 60 is between the range of 0.00 mm and 0.2 mm. In one embodiment, the thickness 64 of the surface hardened layer 60 is between the range of 0.05 mm and 0.15 mm, e.g., approximately equal to 0.10 mm.

The cutting blade 22 is treated with the surface diffusion hardening process such that the surface hardened layer 60 exhibits an apparent hardness having a Vickers Hardness number greater than 1000 HV when tested using the Vickers Hardness Test. In one embodiment, the apparent hardness of the surface hardened layer 60 exhibits a Vickers Hardness number greater than 1200 HV when tested using the Vickers Hardness Test. As noted above, it should be appreciated that the Vickers Hardness Scale is only an example scale against which to measure hardness values of materials. It should be appreciated that the values described above for the Vickers Hardness number may be expressed or converted to a hardness number on some other microhardness scale, such as but not limited to the Knoop hardness scale.

After treating the final shape of the cutting blade 22 with the surface diffusion hardening process, the cutting blade 22 is treated with a through hardening process, such that the core layer 62 exhibits a Rockwell Hardness C Scale value (HRC) between the range of thirty five (35) and fifty five (55). As is understood by those skilled in the art, through hardening diffuses carbon through the entire section of the core layer 62, such that the HRC value of the core layer 62 is uniform throughout. In one embodiment, the through hardening process includes heating the final shape of the cutting blade 22 to a defined uniform temperature throughout the core layer 62, quenching the cutting blade 22 in a liquid after heating the core layer 62 of the cutting blade 22 to the defined uniform temperature, and then tempering the cutting blade 22 after the cutting blade 22 has been quenched. The defined uniform temperature may vary depending upon the material of the blank forming the cutting blade 22, and the desired HRC value for the core layer 62. Similarly, the temperature of the cutting blade 22 may be maintained at the defined uniform temperature for a period of time prior to quenching the cutting blade 22. As is understood by those skilled in the art, the liquid used to quench the cutting blade 22 may include, but is not limited to, water, oil, salt, or caustic. As is understood by those skilled in the art, the tempering process may include, but is not limited to, reheating the cutting blade 22 after the quenching process and then allowing the cutting blade 22 to cool in order to eliminate brittleness.

In another embodiment, the through hardening process may include an austempering process. As is understood by those skilled in the art, austempering is a heat treating process for medium-to-high carbon ferrous metals which produces a metallurgical structure called bainite. The cutting blade 22 may be heated to a hardening temperature, then cooled rapidly enough to a temperature above the martensite start (Ms) temperature and held for a time sufficient to produce the desired bainite microstructure. Austempering is defined by both the process and the resultant microstructure.

As shown in FIG. 4, both the first exterior surface 50 and the second exterior surface 52 have been exposed to the boron atoms, such that the first portion 66 of the surface hardened layer 60 is disposed adjacent the first exterior surface 50, and the second portion 68 of the surface hardened layer 60 is disposed adjacent the second exterior surface 52. However, as shown in FIG. 5, the entire exterior surface 48 of the final shape of the cutting blade 22 need not include the surface hardened layer 60.

In order to introduce the boron atoms into only a portion of the exterior surface 48 of the final shape of the cutting blade 22, such that only one of the first exterior surface 50 and the second exterior surface 52 is treated with the surface diffusion hardening process for example, a mask 70 may be applied to a portion of the cutting blade 22. For example, the mask 70 may be applied to one of the first exterior surface 50 and the second exterior surface 52 to define a masked surface 72. The mask 70 blocks the boron atoms from diffusing into the masked surface 72, thereby preventing the surface hardening of the exterior surface 48 of the cutting blade 22 covered by the mask 70. As shown in FIG. 5, the mask 70 is applied over the second exterior surface 52, such that the second exterior surface 52 is defined as the masked surface 72. As such, the surface diffusion hardening process forms the surface hardened layer 60 only adjacent the first exterior surface 50. After the surface diffusion hardening process, the mask 70 may be removed prior to the through hardening process used to treat the core layer 62.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of manufacturing a cutting blade for an agricultural implement, the method comprising:

forming the cutting blade to define a final shape having an exterior surface;

treating the final shape of the cutting blade with a surface diffusion hardening process, whereby atoms are diffused into the exterior surface of the cutting blade to form a surface hardened layer disposed over a core layer;

treating the final shape of the cutting blade with a through hardening process, such that the core layer exhibits a Rockwell Hardness C Scale value between the range of thirty five and fifty five.

2. The method set forth in claim 1, wherein forming the cutting blade is further defined as forming the cutting blade from a steel blank.

3. The method set forth in claim 1, wherein treating the final shape of the cutting blade with the surface diffusion hardening process is further defined as treating the final shape of the cutting blade with the surface diffusion hardening process such that the surface hardened layer includes a thickness between the range of 0.00 mm and 0.2 mm.

4. The method set forth in claim 3, wherein the thickness of the surface hardened layer is between the range of 0.05 mm and 0.15 mm.

5. The method set forth in claim 1, wherein treating the final shape of the cutting blade with the surface diffusion hardening process is further defined as treating the final shape of the cutting blade with the surface diffusion hardening process such that the surface hardened layer exhibits a hardness having a Vickers Hardness number greater than 1000 HV when tested using the Vickers Hardness Test.

6. The method set forth in claim 5, wherein the hardness of the surface hardened layer exhibits a Vickers Hardness number greater than 1200 HV when tested using the Vickers Hardness Test.

7. The method set forth in claim 1, wherein treating the final shape of the cutting blade with the through hardening process is further defined as treating the final shape of the cutting blade with the through hardening process after treating the final shape of the cutting blade with the surface diffusion hardening process.

8. The method set forth in claim 1, wherein forming the cutting blade to define a final shape includes forming the cutting blade to define a first exterior surface and a second exterior surface that intersect each other to define a cutting edge.

9. The method set forth in claim 8, wherein only one of the first exterior surface and the second exterior surface is treated with the surface diffusion hardening process.

10. The method set forth in claim 8, further comprising masking one of the first exterior surface and the second exterior surface to define a masked surface, whereby the masked surface blocks diffusion of atoms into the exterior surface of the cutting blade.

11. The method set forth in claim 1, wherein treating the final shape of the cutting blade with the through hardening process includes:

heating the final shape of the cutting blade to a defined uniform temperature throughout the core layer;

quenching the cutting blade in a liquid after heating the core layer of the cutting blade to the defined uniform temperature; and tempering the cutting blade after the cutting blade has been quenched.

12. The method set forth in claim 1, wherein treating the final shape of the cutting blade with the through hardening process is further defined as treating the final shape of the cutting blade with an austempering process.

13. The method set forth in claim 1, wherein the cutting blade does not include a coating layer disposed over the exterior surface of the final shape of the cutting blade.

14. The method set forth in claim 1, wherein the surface diffusion hardening process is a boronizing process, whereby boron atoms are diffused into the exterior surface of the cutting blade.

15. The method set forth in claim 1, wherein the surface diffusion hardening process is one of a boronizing process, a nitriding process, or a nitrocarburizing process.

16. A cutting blade for an agricultural implement, the cutting blade comprising:

a body having a first exterior surface intersecting a second exterior surface to define a cutting edge therebetween;

wherein the body includes a surface hardened layer at least partially defining at least one of one of the first exterior surface and the second exterior surface, and a core layer disposed immediately adjacent to the surface hardened layer;

wherein the surface hardened layer includes a thickness between the range of 0.00 mm and 0.2 mm and exhibits a hardness having a Vickers Hardness number greater than 1000 HV when tested using the Vickers Hardness Test; and wherein the core layer exhibits a Rockwell Hardness C Scale value between the range of thirty five and fifty five.

17. The cutting blade set forth in claim 16 wherein the hardness of the surface hardened layer exhibits a Vickers Hardness number greater than 1200 HV when tested using the Vickers Hardness Test.

18. The cutting blade set forth in claim 16, wherein the thickness of the surface hardened layer is between the range of 0.05 mm and 0.15 mm.

19. The cutting blade set forth in claim 16, wherein the surface hardened layer includes a first portion disposed adjacent to the first exterior surface and a second portion disposed adjacent to the second exterior surface, with the core layer disposed between the first portion and the second portion of the surface hardened layer.

20. The cutting blade set forth in claim 16, wherein one of the first exterior surface and the second exterior surface includes serrations.

21. The cutting blade set forth in claim 16, wherein the body is shaped to form a pre-cutter knife for a crop harvesting implement.

22. The cutting blade set forth in claim 16, wherein the surface hardened layer includes boron atoms.

* * * * *